Aug. 30, 1960 R. J. ANDREWS 2,951,125

ELECTRONIC SWITCHING NETWORK

Filed July 3, 1958 2 Sheets-Sheet 1

INVENTOR
R. J. ANDREWS
BY Alan C. Rose
ATTORNEY

INVENTOR
R. J. ANDREWS
BY Alan C. Rose
ATTORNEY 2,951,125

ELECTRONIC SWITCHING NETWORK

Robert J. Andrews, Morris Plains, N.J., assignor to Bell Telephone Laboratories, Incorporated, New York, N.Y., a corporation of New York Filed July 3, 1958, Ser. No. 746,351

16 Claims. (Cl. 179—18)

This invention relates to electronic communication systems and more particularly to switching networks of such systems.

In telephone central office communication systems an arrangement for permitting the interconnection of particular central office subscribers is required. In one arrangement for accomplishing this purpose, a switching circuit interconnects each line or trunk in a first group of terminations with each line or trunk in a second group of terminations. The switching network includes a series of stages between the two groups of terminations, with each stage including a number of bistable breakdown devices as crosspoint switches. The breakdown devices are interconnected at circuit nodes to provide many alternative paths between the two groups of terminations. In electronic switching systems, the crosspoint elements are employed for establishing the path between terminations as the crosspoint elements are switched from their high impedance to their low impedance states. Following the establishment of connections through the network, each series of energized crosspoint switches also constitutes a talking path through the network. In addition, cross-talk between different talking paths is practically eliminated by the blocking action of crosspoints in their high impedance states.

One such system which employs gaseous discharge tubes for the principal network elements, or crosspoints, is disclosed in Patent 2,684,405 of E. Bruce et al., granted July 20, 1954. Networks have also been disclosed which employ various types of semiconductor devices or circuits for the crosspoint elements. Application Serial No. 717,216 of L. W. Hussey, filed February 24, 1958, and assigned to the assignee of this invention, discloses an electronic switching network using transistor circuits as crosspoints.

In the search for ever simpler and better devices for use as crosspoints in telephone switching networks, the PNPN semiconductor diode appears to fulfill many of the requirements. This device is described in "P-N-P-N Transistor Switches" by J. L. Moll et al., page 1174, Proceedings of the I.R.E., volume 44, No. 9. The PNPN diode has a normal high impedance-low current state separated from a low impedance-high current state by a negative resistance region of the voltage-current characteristic. Upon the application of a voltage in excess of a certain breakdown voltage, the device switches to its low impedance state in which it exhibits useful transmission characteristics. One switching network utilizing PNPN diodes as the crosspoints is described in application Serial No. 740,263 of E. A. Woodin, filed June 6, 1958.

Many of the prior switching networks of the type described above experience a condition known as fan-out during the establishing of a network transmission path. That is, in response to selecting, or marking, signals at the network terminals, a plurality of crosspoints per stage are switched "On" as selection progresses through the successive stages of the switching network. After a path through the network is established, the conducting crosspoints which are not included in the path are switched "Off." Fan-out is usually a concomitant of so-called "end-marked" networks and places burdensome requirements on the design of components and control equipment. Specifically a single crosspoint near the terminal may be required to supply current to several hundred crosspoints as a result of the fan-out phenomenon. Furthermore, in such networks there are usually low impedance paths connecting various sources of reference and control potentials to points along the transmission paths, which impair the transmission capabilities of the network.

It has become desirable to produce a switching network employing PNPN diodes in an arrangement which obviates the problem of crosspoint fan-out and also materially reduces the shunting effect of the biasing connections associated with a transmission path.

It is therefore an object of this invention to provide an improved switching network for an electronic telephone communication system. A related object of this invention is to utilize PNPN diodes in such an improved switching network.

A more specific object of this invention is to employ internal marking and control signals in the selection of individual transmission paths through an electronic switching network.

A further object of this invention is to improve the transmission capabilities of an electronic switching network by employing bistable switching devices in the control branches of the internal marking circuitry of the network.

It is a still further object of this invention to reduce the cost of a switching network employing PNPN diodes by arranging to utilize certain of such diodes which are known to exhibit a sensitivity to sudden changes in voltage.

In accordance with one specific embodiment of my invention, these and other objects may be achieved through the use of two groups of PNPN diodes arranged in a switching network. Those of one group are interconnected to provide series paths through the network and are chosen to have a sufficiently good transient response to accept normally applied voltage shifts without undesired switching. The PNPN diodes of this first group are the crosspoint switches of the switching network and are interconnected at the circuit nodes of the switching circuit as described above. The PNPN diodes of the second group are connected between the circuit nodes and certain control voltage sources to provide very high impedances in these shunt paths except when an associated series transmission path is being selected. In accordance with one aspect of the invention, so-called "priming" signals are applied internally of the network from the control voltage sources to select a predetermined transmission path without the undesired fan-out of marking signals throughout the network described above. In accordance with another aspect of this invention, the priming signals comprise slowly-changing sloping voltages devoid of high frequency transient components to permit the use of less costly transient-sensitive PNPN diodes in the shunt branches. The priming signal waveforms may be ramp-shaped or exponential in form, by way of example.

It is a feature of this invention to provide shunt-connected PNPN diodes in a switching network of series-connected PNPN crosspoints to assist in the selection of a transmission path through the network.

In accordance with another feature of this invention a switching network employing PNPN crosspoints is provided with control circuits for applying path selection signals to predetermined circuit nodes through shunt branches of the network.

In accordance with a further feature of this invention a switching network utilizing PNPN crosspoints is provided with circuitry for applying sloping voltages as control signals to transient-sensitive bistable devices in the shunt branches of the network.

An additional feature of this invention is the provision of both series- and shunt-connected bistable devices in a switching network to serve respectively as network crosspoint switches and as the means whereby predetermined circuit nodes are selected in order to establish a network transmission path. In this regard, it is provided that the shunt-connected devices may be transient-sensitive units which are prevented from priming already established connections by constraining the internally applied priming signals to a pulse shape which is devoid of transient components.

The circuits in accordance with the present invention have the advantage of reducing the shunt losses of the transmission paths through the switching network. More specifically, PNPN switches in the shunt control paths have a relatively high impedance in their de-energized states. Furthermore, the provision of such switches having low turn-on current characteristics permits the use of low current capacity elements in the biasing circuits. The shunt-connected control and biasing circuits therefore both have a high alternating current impedance, and do not shunt down the transmission paths through the network to any substantial extent.

A complete understanding of this invention and of these and various other features thereof may be gained from consideration of the following detailed description and the accompanying drawing, in which.

Figure 1:
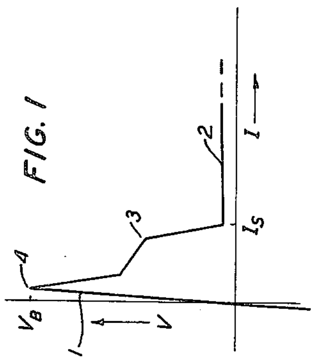
Fig. 1 depicts the voltage-current characteristic curve of a PNPN diode.

The voltage versus current characteristic curve for a PNPN diode is shown in Fig. 1. As shown by the characteristic curve a PNPN diode exhibits a high impedance region 1 to the left of a breakdown voltage peak 4, a low impedance region 2 at high current levels, and a negative resistance region 3 between the peak 4 and the low impedance region 2.

According to the characteristic curve of Fig. 1, it appears that the PNPN diode is admirably suited for use as a crosspoint device in a switching network. However, it has been found that when sudden changes of voltage are applied to the element it has a tendency to switch to its "On" state even though the applied voltage does not reach the breakdown voltage level. This unwanted transient sensitivity can be obviated for certain step voltages by utilizing PNPN diodes having large turn-on current capabilities. This solution necessarily increases the cost of switching circuitry making exclusive use of such PNPN diodes.

Figure 2:
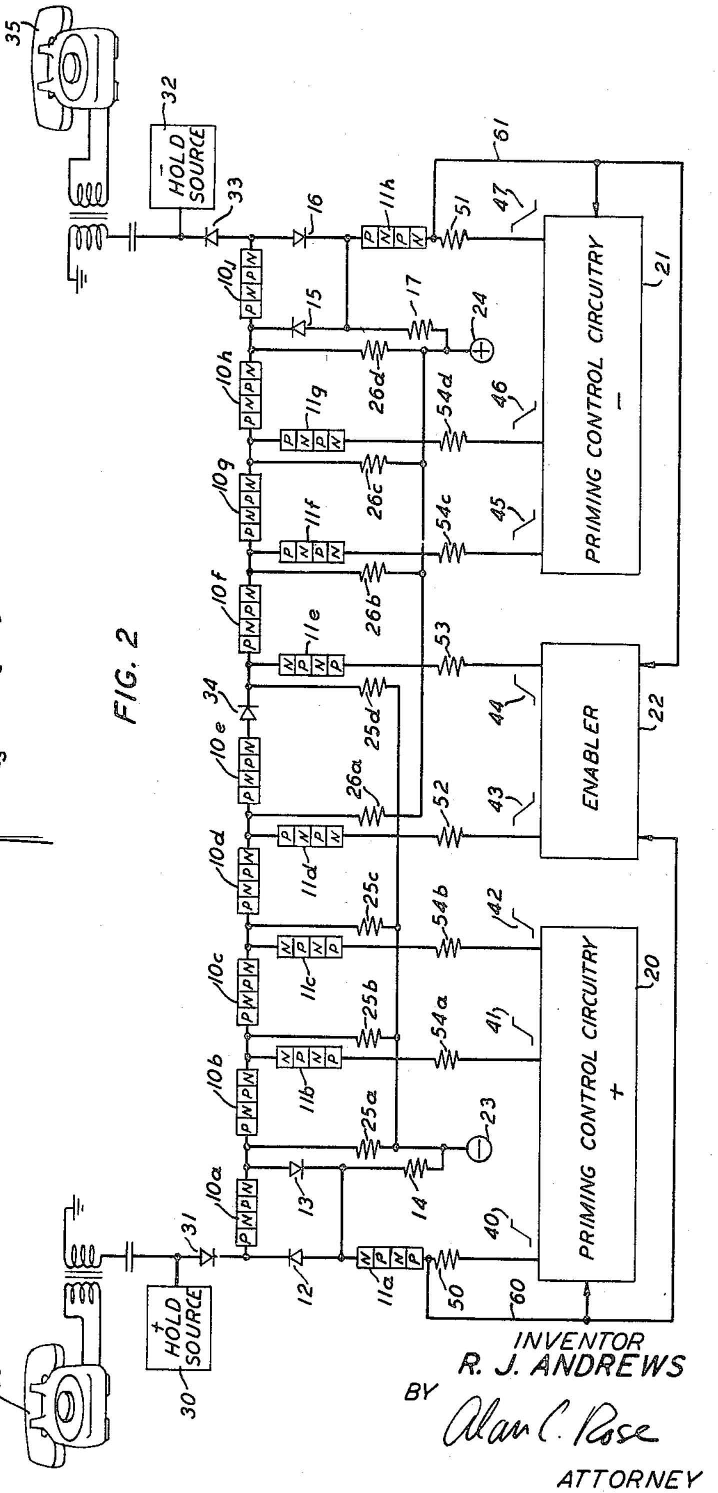
Fig. 2 is a combination block and schematic diagram of one specific embodiment of the invention.

The specific embodiment of the invention depicted in Fig. 2 comprises a plurality of PNPN devices arranged to form a representative transmission path and the supplementary circuitry of a switching network. In the figure, a group of PNPN diodes 10 are arranged in series connection with each other. As will become apparent later, these diodes 10 are subject to sudden shifts in applied voltage. Accordingly, they are chosen to have large turn-on current capabilities so as to withstand these shifts in voltage without switching unless primed. Arranged in shunt connection between certain voltage sources and the common connections of the series PNPN diodes 10 are a second plurality of PNPN diodes 11. Diodes 11*a*, 11*b*, and 11*c* connect positive priming control source 20 to the circuit nodes at the left-hand end of the switching network and to nodes between the series-connected PNPN diodes 10*b* and 10*c*, and between 10*c* and 10*d*. Similarly, shunt diodes 11*f*, 11*g* and 11*h* connect negative priming control source 21 to comparable circuit nodes in the right-hand portion of the circuit.

An enabler circuit 22 is connected to the series diode path by PNPN diodes 11*e* and 11*d*. Bias voltage sources 23 and 24 are connected to the transmission path comprising the diodes 10 through current limiting resistors 25 and 26. Voltage source 23 is also connected to PNPN diode 11*a* and rectifiers 12 and 13 through resistor 14. Similarly, source 24 is connected to PNPN diode 11*h* and rectifiers 15 and 16 through resistor 17. A positive hold source 30 is connected to the left-hand side of PNPN diode 10*a* through rectifier 31 while a negative hold source 32 is connected to the right-hand side of PNPN diode 10*j* through rectifier 33. Shown coupled through the right and left-hand ends of the circuit through appropriate alternating current coupling devices are subscriber subsets 35 and 36, respectively.

In the establishment of a transmission path between subsets 35 and 36 through the series diodes 10, the shunt diodes 11*a* through 11*c* and 11*f* through 11*h*, are broken down by signals from the respective priming control sources 20 and 21. Concerning the use of the term "priming," a circuit node will be designated "primed" when an associated shunt-connected PNPN diode is broken down by a signal from control circuits 20, 21 or 22. Similarly, a primed series PNPN diode switch is one interconnecting two primed nodes.

In accordance with one aspect of the invention, the diodes 11 are selected from low cost units which are sensitive to sudden shifts of applied voltage. This is permissible in the switching network of the invention because the signals which are applied from the control sources 20 and 21 and the enabler 22 are shaped to have a slowly rising leading edge devoid of high frequency transient components.

Priming control source 20 applies positive pulses 40, 41 and 42 to diodes 11*a*, 11*b* and 11*c*, respectively. The signals from the priming control circuits 20 and 21 are applied starting from the center of the network and proceeding outwardly. Since it is assumed that the transmission path is not already established, the nodes between adjacent series PNPN diodes 10 are at the potential of the particular bias voltage source 23 or 24 to which they are connected. Accordingly, diodes 11*b* and 11*c* have the full breakdown voltage applied across them and so switch on, priming the nodes to which they are connected with the voltages of positive-going pulses 41 and 42. Diode 11*a* also breaks down, shifting the potential of the connection between diode 11*a* and resistor 14 from the voltage of bias source 23 to the potential of the priming pulse 40. This forward-biases the rectifier 12 and reverse-biases rectifiers 13 and 31. Diode 10*a* now has its breakdown voltage applied across it from the priming pulse 40 and the negative bias voltage source 23 through resistor 25*a*. It thereupon switches on and the pulse 40 is applied to the left side of diode 10*b*. The operation of the right-hand portion of the circuit which is connected to negative priming control source 21 and positive bias voltage source 24 is similar to the operation of the right-hand portion of the circuit described above. However, the polarities of the shunt-connected diodes 11*e* through 11*h*, and the rectifiers 15, 16 and 33, and the applied voltages, are reversed. As a result of the foregoing, series diodes 10*b*, 10*c*, 10*d*, 10*f*, 10*g* and 10*h* are primed by having the respective priming control pulses applied to their associated circuit nodes. Series diodes 10*a* and 10*j* are already switched on.

The transmission path is now ready for completion by the application of negative pulse 43 to shunt diode 11*d* and positive pulse 44 to shunt diode 11*e* from enabler circuit 22. If the nodes selected by pulses 43 and 44 are idle, diodes 11*d* and 11*e* break down. The polarity of pulses 43 and 44, as applied through diodes 11*d* and 11*e*, is such that the series diode 10*e* is reverse biased. However, in response to these pulses and the priming potential of the priming control pulses 42 and 45, series diodes 10*d* and 10*f* have the full breakdown voltage across them. Diodes 10*d* and 10*f* thereupon break down. Diodes 10*c* and 10*g* then have the full breakdown voltage applied across them from the enabler pulses 43 and 44 and the priming pulses 41 and 46. In this fashion breakdown of successive series diodes 10 continues toward the outer ends of the network until the already conducting terminal diodes 11*a* and 10*j* are reached.

Concerning the relative sizes of the resistors in the control and biasing circuit, appropriate potentials must be obtained at the circuit nodes as successive PNPN switches break down. For example, following breakdown of PNPN switch 10*d*, the node between switches 10*c* and 10*d* must shift from positive to negative, so that the negative voltage from signal 43 is applied to switch 10*c*. Resistor 54*b* must therefore be much greater than resistor 52. In a similar manner the remaining resistors in the biasing and control circuitry must be properly proportioned.

Resistors 50 and 51 have a much smaller resistance than have resistors 52 and 53. Therefore, when all of the diodes 10, except 10*e*, are switched to the low impedance state, the potentials at the nodes associated with diode 10*e* shift to the magnitudes of pulses 40 and 47, respectively. This forward-biases rectifier 34 and diode 10*e*, causing the latter to break down and complete the transmission path. The resulting surge of current through resistors 50 and 51 is detected, indicating a successful completion of the connection. This detection is accomplished by applying the resulting voltage changes at resistors 50 and 51 along signaling leads 60 and 61 to the control circuits 20 and 21. After detection of the path completion, the priming and enabling pulses 40 through 47 are removed.

Upon the removal of the priming and enabling pulses, the rectifiers 31 and 33 become forward biased and the currents from positive and negative hold sources 30 and 32, respectively, maintain the transmission path through the series diodes 10 until it is desired to break the connection. At such time any interruption of the current applied from these hold voltage sources removes the forward bias current from the series diodes 10 and the transmission path is disconnected.

Figure 3:
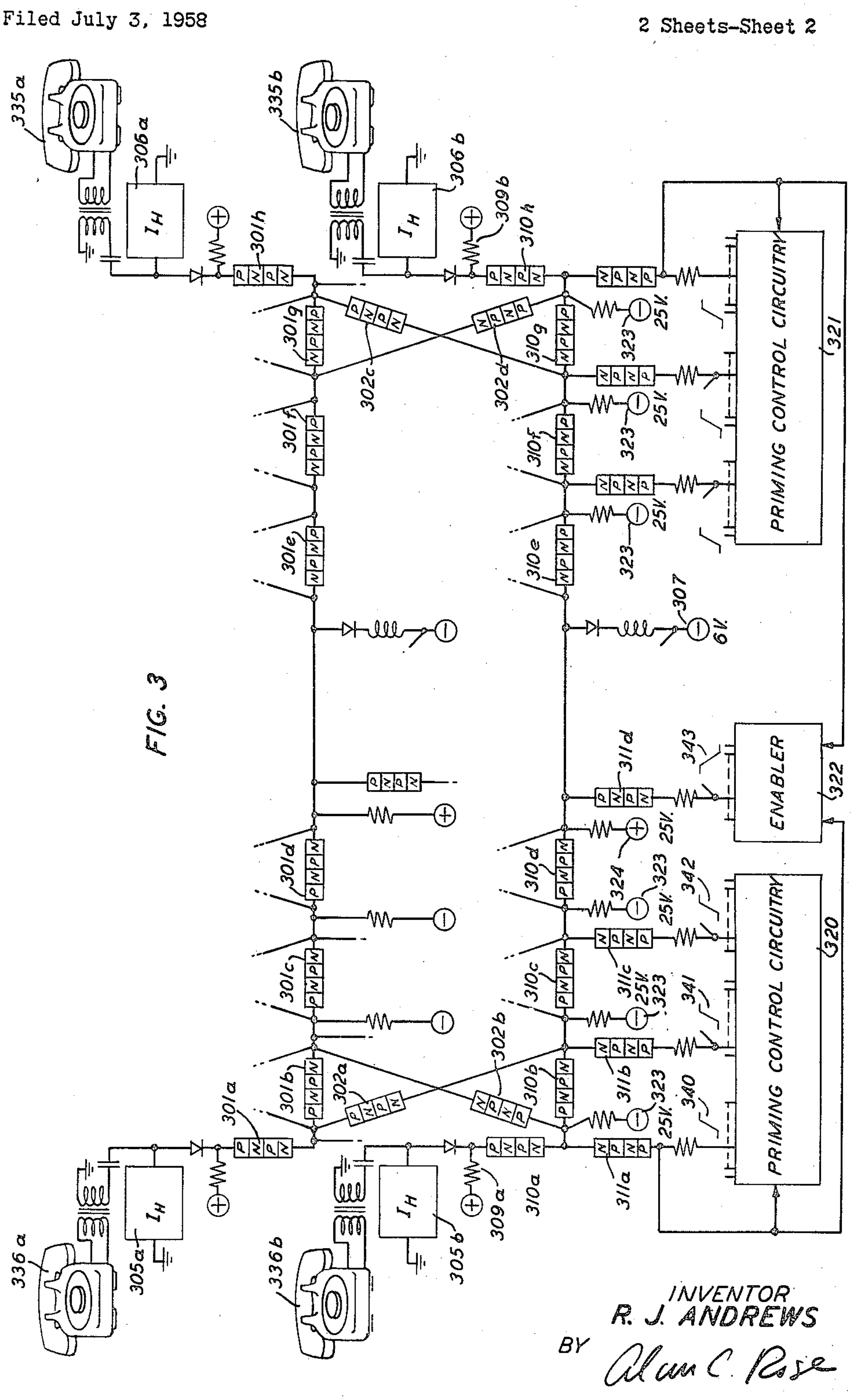
Fig. 3 is a combination block and schematic diagram of another specific embodiment of the invention.

Fig. 3 depicts a combination block and schematic diagram of another specific embodiment of the invention. The circuit shown includes two possible network transmission paths and is representative of a section of a complete switching network. The paths of the figure are similar to the circuit of Fig. 2, the major difference being that the voltages applied at the terminals of Fig. 3 are of the same polarity and an opposite polarity potential is applied at the center of each network path as a holding voltage. Orientation of the series diodes with the N-type terminals toward the center of the network requires a change in the polarity of the applied bias voltages from that shown in Fig. 2, as will be explained below.

The circuit of Fig. 3 includes a plurality of series-connected PNPN diodes 301 and 310 arranged in two representative distinct paths of a section of a typical switching network in accordance with the invention. Cross-connections to other portions of the network are indicated by dashed lines and representative PNPN diodes 302 are shown cross-connecting the two depicted paths. Shunt-connected diodes 311 are shown between certain nodes of the lower path and the priming control sources 320 and 321 and enabler 322. There are also connected to these nodes certain bias voltages 323 and 324 to maintain them at particular potentials when the associated series transmission path is idle. Similar connections are made to the diodes 301 but are only indicated by dashed lines for the sake of simplicity.

Selection of a particular network path is initiated as already described by applying pulses 340, 341 and 342 to prime the corresponding nodes of the left side of the selected path. In the circuit of Fig. 3 as in that of Fig. 2, the priming control signals are applied successively from the center of the network toward the outer terminals. If the path through the PNPN diodes 310 is idle, PNPN diodes 311 will break down in response to pulses 340, 341, and 342, thereby shifting the potentials of the associated nodes in the fashion already described with respect to Fig. 2. Priming of the PNPN diodes in the right-hand section of the lower network path is accomplished in the same manner as with the left-hand section.

Once the diodes 310 are primed, a negative pulse 343 from enabler 322 breaks down diode 311*d* and initiates the breakdown of the two series PNPN diodes 310*d* and 310*e*. Establishment of the transmission path is then completed by the breakdown of succeeding diodes 310 to the terminals of the network. The priming control and enabler pulses are removed after the detection of the surge of current through resistors 309 signifying the completion of the path. The combined action of the constant current sources 305*b* and 306*b* and the negative holding voltage source 307 maintains the established connection until it is to be disconnected. At such time the constant current sources are interrupted, resulting in the switching off of the series diodes 310.

In a switching network it is imperative that no inadvertent connections be made into a busy path during the establishment of another transmission path. In the circuit of Fig. 3 the potentials of the terminals of any series PNPN diode which is part of an established connection are shifted from the value of the connected bias voltage source 323 or 324 to some point between the hold voltage source 307 and ground. Under these conditions, the application of priming pulses such as 340, 341, 342 having an amplitude equal to half the breakdown voltage of the shunt-connected PNPN diodes is insufficient to break down these shunt-connected diodes, and the unwanted priming of a busy path diode is prevented.

To illustrate this feature of the invention, let us assume that the path through the PNPN diodes 310 of Fig. 3 is busy. Each series element of this path experiences approximately a one volt drop across it in the high current condition. Therefore, each terminal of each diode 310 will be at some point near zero potential. The application of any of the priming control pulses 340, 341 or 342 from priming control source 320 or similar pulses from priming control source 321, will apply only one-half the required breakdown potential across the associated shunt-connected PNPN diodes 311. Accordingly, the particular diode 311 to which any priming control pulse has been applied fails to break down, thus preventing unwanted connections to the busy path through diodes 311.

It may also be the case that a single series-connected diode which is shown in one series path may be part of a busy connection along a second path. For example, it will be assumed that a connection between telephone sets 336*b* and 335*a* includes PNPN diodes 310*a*, 302*b* and the diodes of the upper network path to the right of 301*b*. If, under such circumstances, a connection between telephone sets 336*a* and 335*b* is requested, the priming control sources 320 and 321 apply priming control pulses, such as 340, 341, 342 to the shunt-connected PNPN diodes 311. Of the diodes 311 shown in Fig. 3, only 311*a* connected to a node included in the busy path, fails to break down in response to these priming pulses. Other shunt-connected diodes which are not shown, and which are connected to busy nodes, also remain in the high impedance state. In addition the node between PNPN switches 301*a* and 301*b* is primed. The following pulses 343 from enabler 322 then proceed as before to attempt to establish the path through the diodes 310 or 301. Breakdown of the series diodes 310 proceeds in both directions from the diode 311*d* until diode 310*b* is reached. Since diode 310*b* has busy path potential applied to its p-type terminal, only half of the breakdown potential is applied across it and it fails to switch on. However, PNPN switch 302*a* is primed, and the transmission path is completed through PNPN switches 302*a* and 301*a* to the subset 336*a*.

In the completion of transmission paths through the switching circuit, the enabler 322 applies control signals such as 343 to successive central nodes such as those connecting PNPN switches 310*d* and 310*e*, and switches 301*d* and 301*e*. In the example discussed above, a busy path between subsets 336*b* and 335*a* was assumed to include PNPN switches 310*a*, 302*b* and 301*c* through 301*h*. This busy path is held at a voltage between the low negative voltage of source 307 and ground. When an enabling pulse is applied to the PNPN switch connected to the node between switches 301*d* and 301*e*, the voltage across the shunt switch is not enough to break it down. In the absence of signals indicating completion of a transmission path, as discussed in connection with Fig. 2, the enabler 322 proceeds to enable central nodes in successive alternative paths. Upon completion of a path as described above, further stepping of the enabler is inhibited.

It will be noted that the priming signals such as waveform 340 from priming control circuitry 320 and 321 and the signal 343 from enabler 322 exhibit a sloping initial portion. These priming signals are so shaped to prevent unwanted connections to busy paths during the priming of another transmission path. Because the priming control and enabler leads are multiplied to groups of priming diodes, the application of sudden changes of voltage could break down those diodes leading to busy path nodes without exceeding the direct current breakdown potential of the diodes. This undesired result could occur because of the transient sensitivity of these shunt-connected diodes as discussed above. Therefore ramp-shaped signals which are devoid of transient components are employed as priming signals.

The voltages shown in the circuits depicted in the drawing are representative of those which may be selected for the proper operation of the depicted circuit and are not intended to restrict the invention to any specific values. It is to be understood that the above-described arrangements are illustrative of the principles of the invention. Numerous other arrangements may be devised by those skilled in the art without departing from the spirit and scope of the invention.

What is claimed is:

1. A telephone switching network comprising a plurality of terminals between which conducting paths are to be established; a plurality of interconnected series bistable devices; a shunt control circuit connected to common connections between said series bistable devices; said shunt control circuit comprising a biasing source, a shunt-connected bistable device, and a current-limiting element; a source of priming signals coupled to said shunt control circuit to cause selected ones of said common connections to change their potentials; an additional shunt-connected bistable device intermediate said network; and enabling means in series with said additional shunt-connected bistable device to cause said series bistable devices selected by said shunt control circuit and said priming signal source to switch to the low impedance state in succession.

2. A telephone switching network as set forth in claim 1 further comprising terminal control means to maintain the potential of said series bistable devices employed in an established connection at such a value that the associated shunt-connected bistable devices of said shunt control circuit are prevented from changing state when pulsed by said priming pulse source, thereby preserving the isolation of an established connection.

3. A switching network for an electronic communications system comprising a first plurality of bistable devices interconnected to provide transmission paths through said network, a second plurality of bistable devices connected to nodes between adjacent devices of said first plurality, means for applying control voltages to said devices of said second plurality opposite said nodes to prime certain of said nodes adjacent idle devices of said first plurality, and means for switching to the low impedance state certain of those devices of said first plurality adjacent said primed nodes to establish a transmission path through said network.

4. A switching network according to claim 3 wherein said bistable devices of said first plurality comprise PNPN diodes having large turn-on current capabilities, whereby said diodes accept changes in voltage resulting from the change of state of adjacent similar devices without switching unless said adjacent nodes are primed.

5. A switching network for an electronic communications system comprising a first plurality of bistable devices interconnected to provide transmission paths through said network, said devices of said first plurality comprising PNPN diodes having large turn-on current capabilities, a second plurality of bistable devices connected to nodes between adjacent devices of said first plurality, said devices of said second plurality comprising PNPN diodes having low turn-on current capabilities, priming control circuitry including a source of sloping pulses coupled to said second plurality devices opposite said nodes to prime certain of said nodes adjacent idle devices of said first plurality, and means for switching to the low impedance state certain of those devices of said first plurality adjacent said primed nodes to establish a transmission path through said network.

6. An electronic switching network for a telephone communications system comprising a plurality of series-connected PNPN diodes arranged to furnish transmission paths through said network, a plurality of shunt-connected PNPN diodes connected to nodes between adjacent ones of said series-connected diodes, control means for switching to the low impedance state preselected ones of said shunt-connected diodes to prime associated series-connected diodes, means for establishing a transmission path through said network by switching to the low impedance state said primed series-connected diodes, and means for switching said preselected shunt-connected diodes to their high impedance states upon the establishment of said transmission path.

7. An electronic switching network according to claim 6 in which said series-connected PNPN diodes have large turn-on current capabilities, whereby said diodes accept voltage shifts due to the switching of adjacent diodes without changing state unless primed.

8. An electronic switching network according to claim 6 wherein said last-mentioned means includes means for detecting the completion of said transmission path.

9. An electronic switching network for a telephone communications system comprising a plurality of series-connected PNPN diodes having large turn-on current capabilities and arranged to furnish transmission paths through said network, a plurality of shunt-connected PNPN diodes having low turn-on current capabilities and connected to nodes between adjacent ones of said series-connected diodes, control means including a source of sloping pulses for switching to the low impedance state only preselected ones of said shunt-connected diodes to prime associated series-connected diodes, means for establishing a transmission path through said network by switching to the low impedance state said primed series-connected diodes, and means for switching said preselected shunt-connected diodes to their high impedance states upon the completion of said transmission path.

10. A telephone switching network comprising a plurality of terminals at opposite ends of said network, a first plurality of bistable devices interconnected within said network to provide conducting paths between certain of said opposite terminals, a second plurality of bistable devices connected to nodes between adjacent ones of said first bistable devices, control means to prevent the change of state of any of said second bistable devices connected to an established network path, priming means including a source of marking potentials connected to said second plurality of bistable devices to select certain of said first plurality of bistable devices in preparation for establishing a conduction path through said network, and enabling means to initiate the change of state of adjacent ones of said first plurality of bistable devices, which change of state causes the switching of successive devices of said first plurality toward opposite terminals of said network, thereby establishing a transmission path through said network.

11. A telephone switching network having a plurality of terminals, a first plurality of bistable switching devices interconnected to provide transmission paths between said terminals, a second plurality of transient-sensitive bistable devices arranged in shunt connection to nodes between said first plurality devices, bias means connected to said nodes to maintain them at particular potentials for the high impedance condition of associated first plurality devices, pulse means connected to said second plurality devices to change the state of selected second plurality devices associated with first plurality devices which are in the high impedance condition, said nodes assuming a second potential upon the change of state of said associated second plurality devices, and means for switching to the low impedance state a series of said first plurality devices associated with nodes which are at said second potential to establish a transmission path between a particular pair of said terminals.

12. A telephone switching network according to claim 11 wherein said transient-sensitive devices comprise PNPN diodes and the pulses applied thereto are shaped to be devoid of high frequency transient components.

13. A telephone switching system comprising a plurality of terminals between which conducting paths are to be established, a plurality of interconnected series bistable devices, a shunt control circuit connected to common connections between said series bistable devices, said shunt control circuit comprising a biasing source and a two-terminal semiconductor device including both p-type and n-type semiconductive material, a source of priming signals coupled to said shunt control circuit to change the potential of selected common connections, and enabling means to change the state of the series crosspoint devices selected by said shunt control circuit and said priming signal source in succession.

14. A telephone switching network comprising a plurality of terminals between which conducting paths are to be established; a plurality of interconnected series bistable switches; a shunt control circuit connected to common nodes between said series bistable switches; said shunt control circuit comprising a biasing source, a shunt-connected bistable device, and a current-limiting element; a source of priming signals coupled to said shunt control circuit to cause selected ones of said common nodes to change their potentials; and enabling means to cause said series bistable switches selected by said shunt control circuit and said priming signal source to change state in succession.

15. In combination, a plurality of series-connected PNPN diode switches; and a plurality of shunt control circuits, including an additional plurality of PNPN diode switches, connected to circuit nodes between said series-connected diode switches; at least one of said shunt circuits including a rectifier connected to one of said circuit nodes, one of said last-mentioned PNPN diode switches in series with said rectifier, and a source of biasing potential connected to the common connections between said rectifier and the associated PNPN diode switch.

16. In combination, a plurality of series-connected bistable devices; and a plurality of shunt control circuits, including an additional plurality of bistable devices, connected to circuit nodes between said series-connected bistable devices; at least one of said shunt circuits including a rectifier connected to one of said circuit nodes, one of said last-mentioned bistable devices connected in series with said rectifier on the other side of said rectifier from said node, and a source of biasing potential connected to the common connection between said rectifier and the associated bistable device.

References Cited in the file of this patent

UNITED STATES PATENTS

| | | |
|---|---|---|
| 2,855,524 | Shockley | Oct. 7, 1958 |
| 2,859,282 | Dunlap et al. | Nov. 4, 1958 |